Aug. 3, 1965 C. W. GARDNER 3,198,358
VEHICLE MOUNTED LOADER WITH SIDE DUMP
BUCKET TILTING ARRANGEMENT
Filed Aug. 1, 1962 3 Sheets-Sheet 3

INVENTOR.
CHARLES W. GARDNER
BY
ATTORNEYS

United States Patent Office 3,198,358
Patented Aug. 3, 1965

3,198,358
VEHICLE MOUNTED LOADER WITH A SIDE DUMP BUCKET TILTING ARRANGEMENT
Charles W. Gardner, Peoria, Ill., assignor to Caterpillar Tractor Co., Peoria, Ill., a corporation of California
Filed Aug. 1, 1962, Ser. No. 214,033
10 Claims. (Cl. 214—140)

This invention relates to vehicle mounted loaders and more particularly to a vehicle mounted loader comprising a material handling bucket arranged to dump material forwardly and/or to either side of the vehicle.

The problem of operating a material loader in a relatively small work area is particularly apparent where the earth handling bucket may only be dumped in a forwardly direction of the tractor. Such a loader generally comprises a tractor having forwardly extending lift arms and an earth receiving bucket arranged thereon for loading and dumping purposes. As extensively discussed in U.S. Letters Patent No. 2,821,313 to Stanley W. Warner, entitled "Side Dumping Loader," which is assigned to the assignee of this invention, a prime consideration therewith is one of having to reposition the vehicle during each material handling phase of operation. A limitation is also placed on the buckets which are adapted to dump material to only one side of the loader. A tilting arrangement whereby the bucket is adapted to dump on both sides of the loader avoids having to constantly maneuver the tractor into a new position for each loading phase of operation. Furthermore, a problem of positively securing the bucket to a supporting cradle during all phases of a material handling operation is apparent in many conventional loader arrangements.

This invention has overcome many of the aforementioned difficulties by providing a novel side dump bucket arrangement which has a bucket uniquely supported on a cradle and adapted for forward and side dumping movements. The cradle is connected for its movements to the lift and tilt arms of a tractor in a conventional manner. In accordance with novel concepts of this invention, the bucket is arranged to be supported on the cradle by means of at least one first link which is pivotally mounted on a first end portion of the cradle and further pivotally mounted on a second end portion of the bucket. At least one second link is arranged in substantially parallel relationship with the first link and pivotally mounted on a second end portion of the cradle and further pivotally mounted on a first end portion of the bucket. Means are provided for selectively tilting the bucket to a maximum height by either of the first or second links for casting material therein to either side of the tractor. Further novel concepts of this invention comprise a novel locking arrangement for securing the bucket to the cradle during selective phases of a material handling operation.

An object of this invention is to provide a side dump bucket tilting arrangement wherein the bucket thereof may be tilted to a maximum height for expeditiously and efficiently casting material therefrom to one or both sides thereof.

A further object of this invention is to provide a durable side dump bucket tilting arrangement which is adapted to securely retain a side dumping bucket in position during particular phases of a material handling operation.

A further object of this invention is to provide a side dump bucket tilting arrangement wherein the bucket may be positively locked to a cradle during selective phases of a material handling operation.

A still further object of this invention is to provide a side dump bucket tilting arrangement wherein the bucket may be positively locked at one side of the supporting cradle while it is being tipped away from the other side thereof.

These and other and more specific objects of this invention will become apparent from the following description taken in connection with the included drawings wherein.

Figure 1:
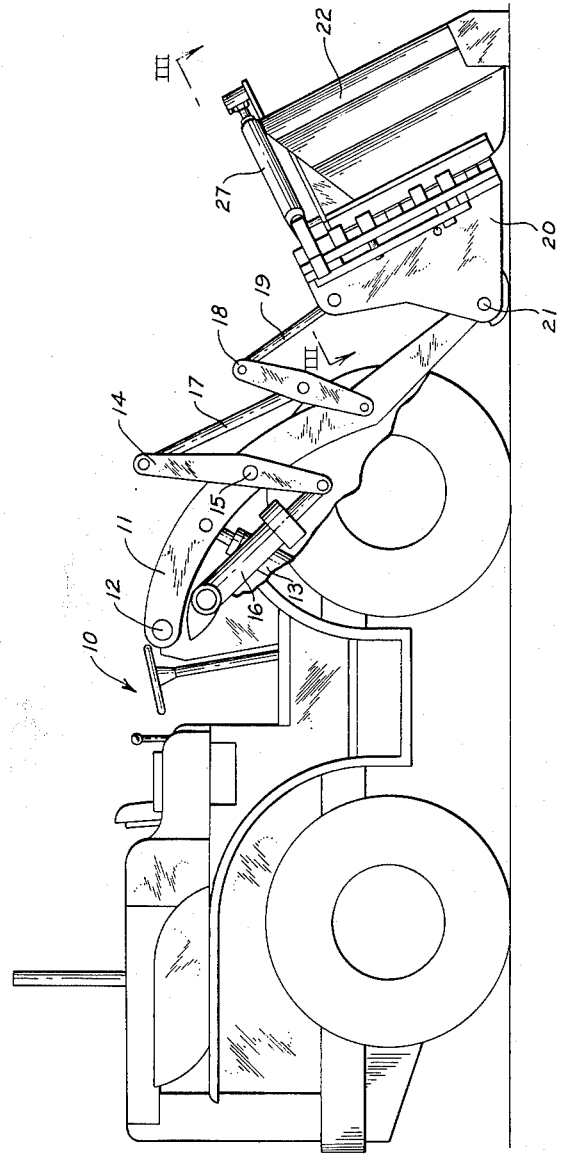
FIG. 1 is a side elevational view with parts broken disclosing a tractor having forwardly extending lift arms arranged to carry the side dump bucket tilting arrangement of this invention.

FIG. 1 discloses one side of a tractor 10 having laterally spaced lift arms or booms 11 pivotally mounted thereon by pivot shafts 12. The lift arms are adapted to be selectively raised or lowered by means of hydraulic cylinders 13. Bellcranks 14 are pivotally mounted on the lift arms by pivot pins 15 and are adapted to be actuated by hydraulic cylinders 16. Links 17 operatively connect the bellcrank to lever 18 and links 19 to afford pivotal movement to a cradle 20 which is pivotally mounted on the lift arm by means of pivot stub shafts 21. The aforementioned constructions and arrangements are conventional and, per se, do not comprise novel aspects of this invention.

Figure 2:
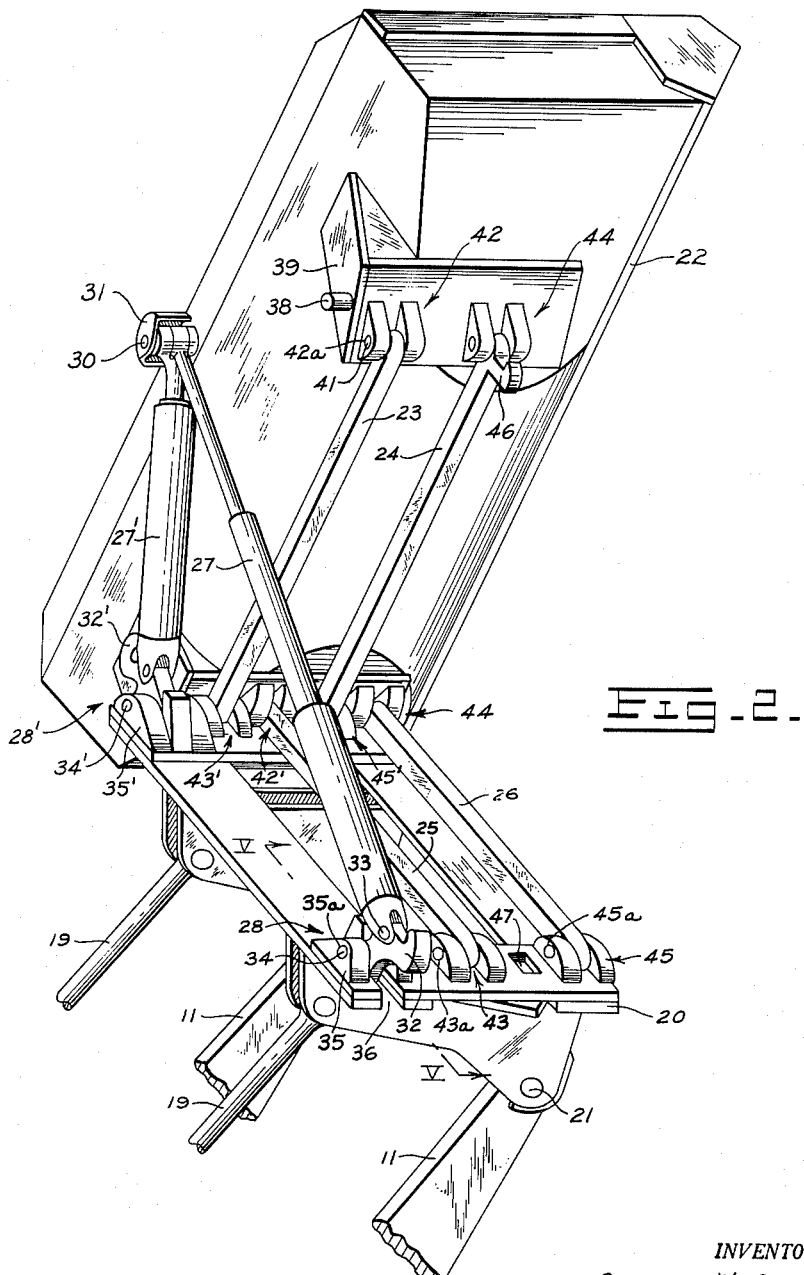
FIG. 2 is a perspective view of the side dump bucket tilting arrangement of FIG. 1, as it would appear with the bucket tilted to one side dumping position.

As more clearly shown in FIG. 2, the dump bucket tilting arrangement of this invention comprises a bucket or dump pan 22 which is adapted to be supported and tilted into a side dumping position on the cradle 20. This arrangement comprises at least one first link or hinge strap 23 or 24 pivotally mounted on a first end portion of the cradle and further pivotally mounted on a second end portion of the bucket. At least one second link 25 or 26 is arranged in substantial parallel and side by side relationship with respect to the first link and pivotally mounted on a second end portion of the cradle and on a first end portion of the bucket. Thus, thrust units comprising suitably arranged hydraulic cylinders 27 and 27' may be utilized to dump material contained in the bucket to either side of the vehicle.

Figure 3:
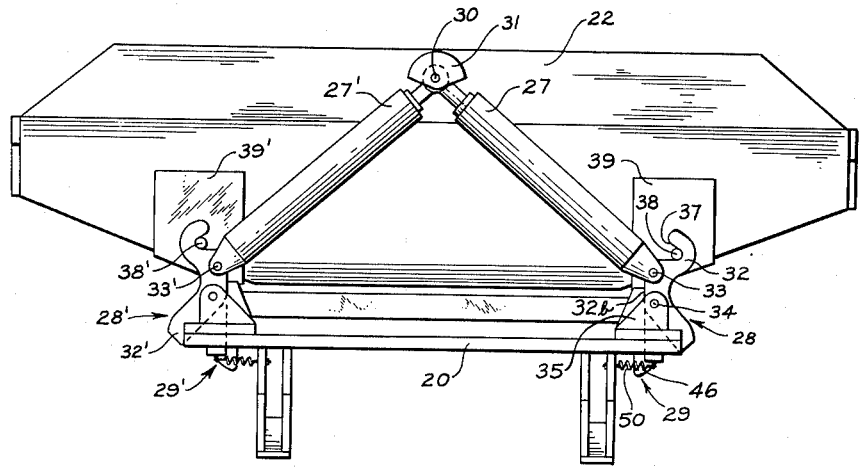
FIG. 3 is an elevational view of the back side of the dump bucket tilting arrangement of FIG. 2 with the bucket shown in a horizontal and supported position on the cradle.
Figure 4:
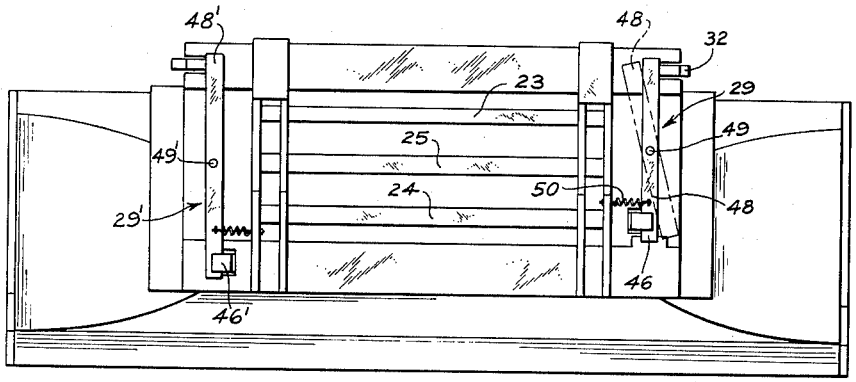
FIG. 4 is a plan view of the under side of the side dump bucket tilting arrangement of FIG. 3.

As more clearly shown in FIG. 3, further novel concepts of this invention comprise the utilization of first latching or locking means 28 and 28' which function to cooperate with the hydraulic cylinders 27 to selectively lock one or both ends of the bucket to the cradle during selected phases of a material handling operation. As more clearly shown in FIG. 4, second latching or locking means 29 and 29' may also be utilized to further positively secure the ends of the bucket to the cradle when the bucket is maintained in its horizontally disposed position as shown in FIG. 3. These latter locking functions will be hereinafter more fully explained.

Referring once again to FIGS. 2 and 3, it is to be noted that the constructions and arrangements of the actuating means utilized to raise the bucket for side dumping purposes on each side of the cradle, as well as the latching mechanisms 28 and 28' which are employed therewith, are illustrated as being substantially identical. Thus, only the mechanisms employed on one side of the side dump bucket tilting arrangement will be explained. The corresponding mechanisms located on the other side of this arrangement will be denoted with the same number accompanied by a prime symbol.

The rods of hydraulic cylinders 27 and 27' are pivotally mounted on a pivot pin 30 preferably disposed centrally of the bucket. An arcuate shield 31 may be provided to house this pivotal connection. The other end of hydraulic cylinder 27 is pivotally mounted on a latch member 32 by means of pivot pin 33. The latch member is in turn pivotally mounted on a pivot pin 34 which is fixed in bores 35a of spaced and upstanding lugs or uprights 35 secured to the cradle.

Figure 5:
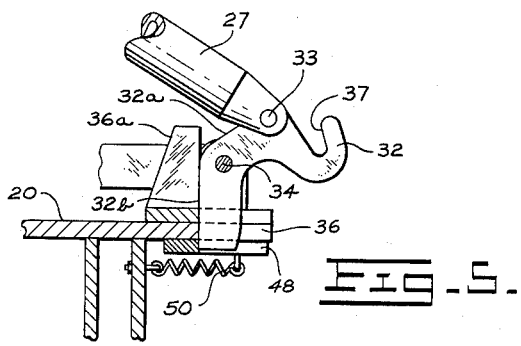
FIG. 5 is an enlarged fragmentary view partially sectioned in the the direction of arrows V—V in FIG. 2.

A slot 36 is formed at this end portion of the cradle, as more clearly shown in FIG. 5, to permit limited swinging movements of the latch member and terminates in a stop member 36a formed on the cradle at the inward extremity of the slot. Thus, both clockwise and counter-clockwise movements of the latch member may be closely controlled. Particularly note that the latch member as more clearly shown in FIG. 5 has surface portions 32a and 32b formed thereon for this purpose. As more clearly shown in FIG. 3, an arcuate recess or hook portion 37 is formed on the latch member and is adapted to engage a pin 38 which is secured to a bracket 39 of the bucket. Thus upward movement of the pin 38 and the bucket is prevented when the bucket and latch are in the position shown in FIG. 3. However, as will be hereinafter more fully understood, when cylinder 27 is actuated to pivot the latch member clockwise about pivot pin 34, that particular end of the bucket will thereafter be permitted to raise from the cradle.

Referring once again to FIG. 2, link 23 is pivotally mounted on a pivot pin 41 fixed in apertures 42a formed in spaced lugs 42 which are secured to bracket 39 of the bucket. In a like manner, the other extremity of link 23 is pivotally mounted on a pin which extends into apertures 43'a (not shown) formed in spaced lugs on the cradle at 43'. The link 24, comprising the second of this pair of links, is likewise pivotally mounted at connections 44 and 45'. The spaced lugs or uprights of connections or anchor means 43 and 45 are preferably arranged to have the axes of the series of pivot pin receiving bores 43a and 45a, respectively, thereof in aligned relationship with each other and also in coaxial relationship with the axis of bore 35a whereat jack 27 is mounted onto the cradle through latch 32, and where bores of anchor means 42 and 44 are also in coaxial relationship when the bucket is in its horizontal position. Link 24 has a hook or latch portion 46 which is adapted to project through aperture 47 formed in the cradle for purposes hereinafter explained. The second pair of links 25 and 26 are pivotally mounted in the cradle and bucket in a like, but reversed manner as compared with links 23 and 24. Therefore, the specific details of links 25 and 26 will not be further explained.

As briefly stated above, second latching or locking means 29 and 29' (FIG. 4) may be employed along with first locking means 28 and 28' to further assure positive securance of the bucket to the cradle during critical phases of operation. As more clearly shown in FIG. 4, the latching mechanism 29 comprises a swivel bar 48 which is pivoted on a pivot pin 49 preferably arranged at the substantial mid-portion thereof and fixed to the bottom of the cradle. The bar 48 is arranged to abut the lower portion of latch member 32 and further arranged to have the second end thereof engage the downwardly extending hook portion 46 of link 24. Thus, in the solid line position shown in FIG. 4, bar 48 is biased by spring 50 into locking engagement with the hook 46 to thereby prevent upward movement of the bucket thereat.

In operation, when it is desired to tilt the bucket into the position shown in FIG. 2 for unloading purposes, the hydraulic jack 27 is actuated in a conventional manner to extend and apply a force between pivot pins 30 and 33. Since the weight of the bucket affords a relatively large resisting force, the first action will be one of pivoting latch member 32 in a clockwise direction about pivot pin 34 until surface portions 32b thereof abut stop member 36a as shown in FIG. 5. This action functions to unlatch hook portion 37 from pin 38 and simultaneously functions to pivot second latch member 48 to the dotted line position shown in FIG. 4. Thus, the double locking feature afforded by latch member 32 and pin 38 of the bucket and bar 48 and hook 46 are overcome to permit the hydraulic cylinder 27 to further extend to tilt the bucket to the maximum height position shown in FIG. 2.

Simultaneously with this tilting action, the second latch member 32', although pivoted with the bucket, is maintained in its locked position with pin 38'. Furthermore the second swivel bar 48' may be partially or completely released from hook 46' of link 26 during this tilting operation, due to the pivotal movements imparted to latch member 32' by pin 38'. However, the prime function of the second locking means 29 and 29' is to secure the bucket in a horizontally disposed position when supported on the cradle, as shown in FIG. 3. It should be understood, however, that this second locking means may be suitably arranged to also assure further positive locking of one end of the bucket to the cradle during any particular tilting phase of operation.

Retraction of the hydraulic jack 27 will function to pivot latch member 32 into locking engagement with pin 38 and permit swivel bars 48 and 48' to lock with the hooks 46 and 46' of the links 24 and 26, respectively, in a manner hereinbefore described. Thus, the bucket is again secured to the cradle in the position shown in FIG. 3 for transportation or forward tilting phases of operation. It is obvious that actuation of hydraulic jack 27' will function to dump the bucket in a direction opposite to that shown in FIG. 2, in much the same manner as hereinbefore described.

It should be understood that in accordance with novel subcombination concepts of this invention that for certain applications, the above described side dump bucket arrangement may be modified to provide for side dumping to only one side thereof.

I claim:

1. A side dump bucket arrangement comprising a cradle, a bucket arranged to be supported on said cradle, at least one first link pivotally mounted on a first end portion of said cradle and further pivotally mounted on a second end portion of said bucket, at least one second link arranged in substantial parallel relationship with said first link and pivotally mounted on a second end portion of said cradle and further pivotally mounted at a first end portion of said bucket, actuating means operatively connected between said cradle and said bucket for selectively tilting said bucket on said first link about the first end of said cradle or on said second link about said second end of said cradle and locking means including a pivoted latch member operatively associated with each of the first and second end portions of said bucket and said actuating means for locking both end portions of said bucket to said cradle and responsive to actuation of said actuating means for releasing the first or second end portion of said bucket from the first or second end portion of said cradle, respectively.

2. In a side dump bucket arrangement, a combination comprising a cradle, a bucket arranged to be supported on said cradle, at least one link pivotally mounted on a first end portion of said cradle adjacent to a first end of said bucket and further pivotally mounted on a second end portion of said bucket, actuating means operatively connected between a second end portion of said cradle and said bucket for selectively tilting said bucket on said link about the first end portion of said cradle and first locking means operatively connected to said actuating means and said cradle for normally locking said bucket to said cradle and for effecting an unlocking thereof responsive to actuation of said actuation means, said first locking means comprising a latch member pivotally mounted on said cradle.

3. The invention of claim 2 further comprising second locking means operatively associated with and normally locking said link to said cradle and responsive to said actuating means for unlocking said link from said cradle.

4. A side dump bucket arrangement comprising a cradle adapted to be operatively connected to lift arms of a tractor, a bucket arranged to be supported on and tilted with respect to said cradle, a first and second pair of links arranged in substantial parallel relationship between said cradle and bucket, said first pair of links pivotally mounted on a first end portion of said cradle and further pivotally mounted on a second end portion of said bucket, said second pair of links pivotally mounted on a second end portion of said cradle and further pivotally mounted on a first end portion of said bucket, one of said second links arranged to lie between said first pair of links, first and second latch members pivotally mounted on the first and second end portions of said cradle, respectively, first and second pin members secured to the first and second end portions of said bucket and arranged for locked engagement with said first and second latch members, respectively, when said bucket is supported on said cradle, and actuating means for selectively either disengaging the first latch member from said first pin member and pivoting said bucket on said second pair of links about said second end portion of said cradle or for disengaging the second latch member from said second pin member and pivoting said bucket on said first pair of links about said second end portion of said cradle.

5. The invention of claim 1 further comprising means responsive to said actuating means for locking at least one said first first and second links to said cradle when the other of said links is pivoted by said actuating means.

6. The invention of claim 1 wherein said locking means comprise first and second latch members pivotally mounted on first and second end portions of said cradle, respectively.

7. The invention of claim 1 further comprising additional means normally operatively associated with said first link and said cradle for locking the first end portion of said bucket to the first end portion of said cradle and responsive to said actuating means for unlocking the first end portion of said bucket from said cradle.

8. In a side dump bucket arrangement comprising a bucket tiltably mounted on a cradle, first locking means for normally locking an end portion of said bucket to said cradle, actuating means for actuating said first locking means to release the end portion of said bucket from said cradle and for thereafter tilting said bucket on said cradle and second locking means for normally locking said end portion of said bucket to said cradle and responsive to said first locking means for releasing the end portion of said bucket from said cradle prior to the time said actuating means tilts said bucket.

9. The invention of claim 8 wherein said first locking means comprises a latch member pivotally mounted on the end portion of said cradle and said second locking means comprises a swivel member piovtally mounted on the end portion of said cradle, said latch member arranged to pivot said swivel member.

10. A two-way side dump bucket arrangement comprising a cradle, a bucket arranged to be supported on said cradle, means for tilting said bucket about a first or second end portion of said cradle and locking means comprising first and second pivoted latch members for locking said first and second end portions of said bucket to the first and second end portions of said cradle, respectively, when said bucket is supported thereon, said latch members being responsive to said tilting means whereby only one end portion of said bucket is released from said cradle when said bucket is tilted, said first and second latching members being arranged to release one side of said bucket prior to a tilting thereof.

References Cited by the Examiner

UNITED STATES PATENTS

| 2,047,051 | 7/36 | Armington et al. | 298—18 |
| 2,821,313 | 1/58 | Warner | 214—140 |
| 3,022,910 | 2/62 | Anderson et al. | 214—140 |

HUGO O. SCHULZ, *Primary Examiner.*